United States Patent Office 3,505,326
Patented Apr. 7, 1970

3,505,326
HYDROXYAMINO-s-TRIAZINES
John Thomas Shaw, Springfield, Mass., assignor to American Cyanamid Company, Stamford, Conn., a corporation of Maine
No Drawing. Continuation-in-part of application Ser. No. 190,236, Apr. 26, 1962. This application Sept. 28, 1964, Ser. No. 399,884
Int. Cl. C07d 55/46, 55/44, 55/22
U.S. Cl. 260—249.6         5 Claims

ABSTRACT OF THE DISCLOSURE

Hydroxyamino-s-triazines are provided having the formula:

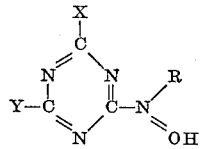

wherein X and Y are individually selected from the group consisting of hydrogen, halogen, hydroxy, lower alkoxy, monocarbocyclic aryloxy, monocarbocyclic arylthio, and

with the proviso that both X and Y cannot be hydroxy; each R is a member selected from the group consisting of hydrogen, alkyl of up to 18 carbon atoms, cycloalkyl of up to 18 carbon atoms, monocarbocyclic aryl, hyroxy lower alkyl, and cyanoethyl; and $R^1$ is a member selected from the group consisting of R and OH groups, said aryl moieties having up to two substituents selected from the group consisting of nitro, trifluoromethyl, hydroxy, cyano, lower alkoxy, and halo radicals.

---

These compounds are chelating agents for heavy metals.

This application is a continuation in part of application, Ser. No. 190,236, filed Apr. 26, 1962 and now abandoned.

This invention relates to, and has for its object, the provision of a new class of compounds of the formula:

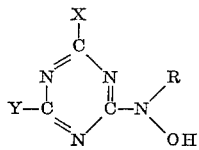

wherein X and Y are individually either hydrogen, halogen (particularly bromine or chlorine), hydroxy, monocyclic aryloxy, monocyclic arylthio, lower alkoxy,

each R is either hydrogen, alkly of up to 18 carbons, cycloalkyl, monocyclic aryl, hydroxy lower alkyl or cyan oethyl, and $R^1$ is R or —OH. The invention likewise contemplates acid addition salts of the compounds of Formula I. This alkyl moieties in Formula I may have up to eighteen carbons and bear electronegative substituents (e.g., $NO_2$, OH, cyano, lower alkoxy and halo radicals). In practice, however, alkly radicals of no more than twelve carbon atoms and monocyclic aryl radicals which bear less than three lower alkyl, $CF_3$, nitro, halo, cyano, trihalomethyl and/or lower alkoxy substituents, are preferred.

The compounds of Formula I can be prepared by reacting a halo-s-triazine of the formula:

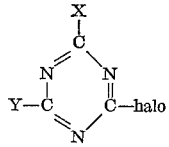

where X and Y are as above defined, with an hydroxylamine in a suitable solvent and in the presence of an alkaline material.

The halo-s-triazines which may be used include cyanuric chloride, 2-chloro-4,6-diamino-s-triazine, 2,4-dichloro-6-diethylamino-s-triazine, 2-anilino-4,6-dichloro-s-triazine, 2-(N-methylanilino)-4,6-dichloro-s-triazine, 2-amino-4,6-dichloro-s-triazine, 2-chloro-4,6-bis(diethylamino)-s-triazine, 2-butylamino-4,6-dichloro-s-triazine, 2-dibutylamino - 4,6-dichloro-s-triazine, 2-anilino-4-chloro-6-diethylamino-s-triazine, 2,4-dichloro-6-(1,1 - dihydropentafluoro-n-propylamino)-s-triazine, etc.

The hydroxylamines include hydroxylamine and its N-substituted derivatives, such as N-methylhydroxylamine, N-ethylhydroxylamine, N-phenylhydroxylamine, N-(p-chlorophenyl)hydroxylamine, N-(2-methylphenyl) - hydroxylamine and N - (3-chloro-2-methylphenyl)hydroxylamine.

In the reaction of a halo-s-triazine with the hydroxylamine, it is necessary that at least one halogen of the halo-s-triazine be replaced by an hydroxylamino group. At the same time, one or more additional halogens of the halo-s-triazine may be replaced by a hydroxy group. The following procedures of carrying out the reaction are given as examples of the possible methods.

In the case where *all* halogens on the triazine ring are to be replaced the preferred method is to add the halo-s-triazine to a cold aqueous solution (at about 0–5° C.) of an excess (i.e. 2–6 moles/mole of triazine) of the excess (i.e. 2–6 moles/mole triazine) of the hydro hydroxylamine and the reaction mixture is gradually heated to effect the reaction. It is advantageous to dissolve the amine as the hydrochloride, or other salt, in water and to add an equivalent amount of alkali, such as sodium hydroxide, to liberate the free oxyamine. A solution of the halo-s-triazine in a suitable inert organic solvent such as an oxygenated solvent, e.g. dioxane, 1,2-dimethoxyethane and dimethyl ether of diethyleneglycol is then added to the aqueous solution of the amine. Where the amount of the amine used is not sufficient to replace all the halogens of the triazine starting material, the resulting product will be a halo-hydroxyamino-s-triazine. The latter can be used as such or further reacted with an amine (e.g. ethylamine, ethanolamine, cyclohexylamine, aniline, phenylenediamine, etc.), a phenol (e.g. phenol or cresol) or a mercaptan (e.g. phenylmercaptan) under alkaline conditions to effect a further replacement of the remaining halogen groups in the triazine ring. The extent of replacement will, of course, depend on the molar ratio of the s-triazine to the amine, phenol or mercaptan.

Additional methods of reaction include (1) the addition of aqueous alkali (e.g. sodium hydroxide) to a mixture of the halo-s-triazine and hydroxylamine hydrochloride in an ether, or other inert solvent, (2) the reaction of a halo-s-triazine and an oxyamine in alkanolic solution, (3) the addition of a solution of the amine in dioxane to a slurry of the halo-s-triazine in water followed by the addition of an aqueous alkali, (4) the addition of small amounts of water to a mixture of a halo-s-triazine, hydroxylamine salt and an alkali in water-ether medium.

The compounds of this invention are chelating agents for heavy metals, particularly iron. They are thus useful as sequestering agents or as deactivators for the prevention of oxidative deterioration of vegetable and mineral oils due to "heavy metal catalyzed" oxidation reactions. Additionally, compounds within the scope of Formula I have fungicidal and/or bactericidal properties.

The following examples are presented to further illustrate the present invention. Parts and percentages are expressed on a weight basis.

EXAMPLE 1

2,4,6-tris(hydroxyamino)-s-triazine

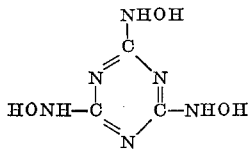

A solution of 167 parts (2.4 moles) of hydroxylamine hydrochloride in 200 parts of water is cooled to −10° C., and the solution is neutralized by the dropwise addition of a solution of 96.0 parts (2.4 moles) of sodium hydroxide in 200 parts of water, while keeping the temperature at about −10° C. To this solution at about −10° C. there is added dropwise over a period of 0.5 hour, a solution of 36.9 parts (0.2 mole) of cyanuric chloride in 100 parts of dioxane. The resulting reaction mixture is stirred at about 2° C. for one hour, at about 55° C. for two hours, and finally at reflux temperature (about 91° C.) for one hour. The violet-colored solution of pH 6.0 is cooled to 0° C., and the precipitate is separated by filtration. The product, after slurrying with water, filtering and drying, melts at about 218° C. with decomposition.

EXAMPLE 2

2,4-diamino-6-hydroxyamino-s-triazine

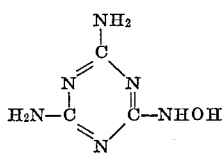

To a solution of 55.6 parts of (0.8 mole) of hydroxylamine hydrochloride and 200 parts of water which has been neutralized by the dropwise addition of a solution in 32.0 parts (0.8 mole) of sodium hydroxide in 200 parts of water, there is added 29.1 parts (0.2 mole) of 2-chloro-4,6-diamino-s-triazine at about −5° C. After the reaction mixture is heated at about 55° C. for three hours and then at about 102° C. for one hour, it is filtered hot and the filtrate is allowed to cool. The resulting precipitate is separated by filtration, washed with distilled water and air dried. The product is purified by crystallization from water. It melts at a temperature above 300° C.

EXAMPLE 3

2-chloro-4-hydroxy-6-hydroxyamino-s-triazine

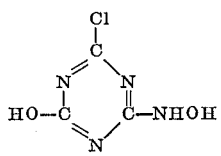

To a solution of 18.4 parts (0.1 mole) of cyanuric chloride in 210 parts of ether at 0° C., there is added 6.95 parts (0.1 mole) of hydroxylamine hydrochloride and then dropwise, at about 0° C., over a two hour period, a solution of 8.0 parts (0.2 mole) of sodium hydroxide in 50 parts of water. After stirring at about 3° C. for 1.5 hours, the ether portion of the reaction mixture is evaporated at room temperature and the residue is dried in vacuo over $P_2O_5$.

EXAMPLE 4

2,4-dihydroxy-6-hydroxyamino-s-triazine

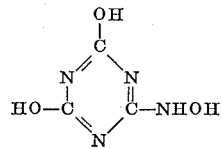

A solution of 9.2 parts (0.4 mole) of sodium in 80 parts of methanol is added to a solution of 28.6 parts (0.41 mole) of hydroxylamine hydrochloride in 160 parts of methanol at about 23° C. After stirring at room temperature for 20 minutes, the solids are separated by filtration, and the filtrate is treated at 11° C. with 18.4 parts (0.1 mole( of cyanuric chloride. The reaction mixture is stirred at room tempertture for four hours. The precipitate is separated, stirred with water, filtered and dried. The product melts at a temperature above 330° C.

EXAMPLE 5

2,4-dichloro-6-(N-phenylhydroxyamino)-s-triazine

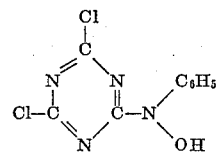

A solution of 18.4 parts (0.1 mole) of cyanuric chloride in 50 parts of dioxane is added at about 30° C. to 60 parts of ice water. To the resulting slurry, there is added dropwise, a solution of 10.9 parts (0.1 mole) of N-phenylhydroxylamine in 25 parts of dioxane at about 0° C. followed by a solution of 5.3 parts (0.05 mole) of sodium carbonate in 15 parts of water. After stirring for one hour at about 3° C., the liquid portion of the reaction mixture is decanted, and the residue is treated twice with 150 parts of ice water, filtered and washed with ice water. After drying over $P_2O_5$, the product melts at 120–123° C. with decomposition.

EXAMPLE 6

2-diethylamino-4,6-bis-(hydroxyamino)-s-triazine

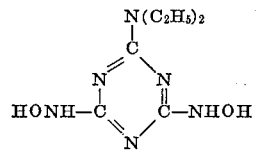

To a solution of 27.8 parts of hydroxylamine hydrochloride (0.4 mole) in 35 parts of water neutralized at a temperature below 23° C. with a solution of 15.6 parts (0.39 mole) of sodium hydroxide in 35 parts of water, add dropwise at about 5° C., 11.05 parts (0.05 mole) of 4,6-dichloro-2-diethylamino-s-triazine dissolved in 50 parts of dioxane. The reaction mixture is heated for one hour at about 60° C., refluxed (90° C.) for two hours, cooled and filtered. The product is recrystallized from aqueous methanol to give a melting point of 189–190° C.

EXAMPLE 7

2-anilino-4-chloro-6-hydroxyamino-s-triazine

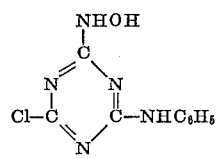

To a solution of 7.64 parts (0.11 mole) of hydroxylamine hydrochloride in 60 parts of methanol, add a solution of 2.3 parts (0.1 mole) of sodium in 40 parts of methanol at a temperature of about 15° C. After removing the precipitate from this reaction mixture, 12 parts (0.05 mole) of 2-anilino-4,6-dichloro-s-triazine is added in portions to the filtrate at about 20–30° C. The reaction mixture is heated at 40–45° C. for 20 minutes and is then filtered, and the filtrate evaporated in vacuo to a thick paste which is then treated with about 75 parts of acetone, filtered and dried in vacuo.

EXAMPLE 8

2-anilino-4-hydroxy-6-hydroxyamino-s-triazine

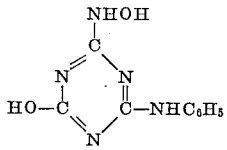

To a solution of 27.8 parts (0.4 mole) of hydroxylamine hydrochloride in 35 parts of water neutralized with 15.6 parts (0.39 mole) of sodium hydroxide in 35 parts of water, there is added at about 5° C. a solution of 12 parts (0.05 mole) of 2-anilino-4,6-dichloro-s-triazine in 50 parts of dioxane. The reaction mixture is then heated at about 60° C. for one hour, refluxed (90° C.) for 1.25 hours and then allowed to cool. After decanting the liquid portion, the solid residue is stirred with 150 parts of water and the mixture is filtered. The product, after washing with water and drying in vacuo over $P_2O_5$, is crystallized from a mixture of water and Cellosolve to give a product which melts at 198–200° C. with decomposition.

EXAMPLE 9

2-N-methylanilino-4,6-bis(hydroxyamino)-s-triazine

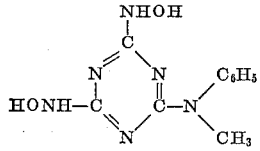

A solution of 111.2 parts (1.6 moles) of hydroxylamine hydrochloride in 150 parts of water is neutralized at about 15° C. with a solution of 62.4 parts (1.56 moles) of sodium hydroxide in 150 parts of water. To the resulting solution there is added dropwise over a 15 minute period a solution of 50.98 parts (0.24 mole) of 2-(N-methylanilino)-4,6-dichloro-s-triazine while maintaining the temperature at about 0° C. The reaction mixture is then stirred at 55–60° C. for one hour, followed by a reflux period (90° C.) for 3 hours. The cooled reaction mixture is filtered, and the filter cake is washed with water. The product, after crystallization from aqueous methanol, melts at about 177–178° C.

EXAMPLE 10

2,4-bis(ethylamino)-6-hydroxyamino-s-triazine

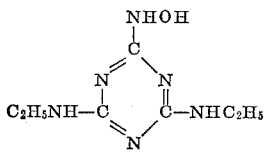

To a solution of 41.4 parts (0.596 mole) of hydroxylamine hydrochloride in 60 parts of water, add a solution of 23.2 parts (0.58 mole) of sodium hydroxide in 60 parts of water. To the resulting solution, add over a 40 minute period a slurry of 30.0 parts (0.149 mole of 2-chloro-4,6-bis(ethylamino)-s-triazine in about 200 parts of dimethyl ether of diethyleneglycol while maintaining the temperature between 0° and 15° C. After the addition of 50 parts of water, the reaction mixture is heated for one hour at about 60° C. and for three hours at the reflux temperature. The cooled reaction mixture is filtered and the precipitate is recrystallized from ethanol and then from aqueous methanol. The product melt at about 199–201° C.

EXAMPLE 11

2-hydroxy-4,6-bis(hydroxyamino)-s-triazine

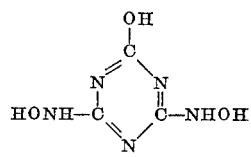

To a solution of 27.8 parts (0.4 mole) of hydroxylamine hydrochloride in 35 parts of water is added a solution of 15.6 parts (0.39 mole) of sodium hydroxide in 35 parts of water. To the resulting solution, at about 5° C., is then added a solution of 9.2 parts (0.05 mole) of cyanuric chloride in about 50 parts of dioxane. The reaction mixture is then heated at 40–50° C. for one hour, cooled and filtered. The product, after washing with water and then with ether, melts above 330° C.

EXAMPLE 12

Table I illustrates the antifungal and antibacterial activities of several compounds of this invention in terms of the minimal inhibitory concentration in micrograms per milliliter of standard culture.

TABLE I

| Product of Example | Organism | Mcg. per ml. |
|---|---|---|
| 4 | *Candida mycodema* [1] | 62 |
| 9 | *Myrothecium verrucaria* [1] | 125 |
| 10 | *Bacillus subtilis* [2] | 250 |
| 11 | *Candida mycodema* [1] | 125 |

[1] Fungi.
[2] Bacteria.

EXAMPLE 13

2-chloro-4,6-bis(N-hydroxy-N-phenylamino)-s-triazine

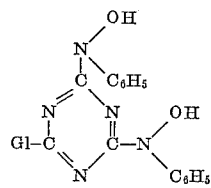

An aqueous dioxane suspension of cyanuric chloride is prepared by adding in portions a solution of 12.7 parts (0.0689 mole) of cyanuric chloride in 38 parts of dioxane to 70 parts of ice water at a temperature below 10° C. Then a solution of 15 parts (0.137 mole) of N-phenylhydroxylamine in 48 parts of dioxane is added dropwise at about 2° C. in 22 minutes. After allowing the cream-colored reaction mixture to warm to 19° C., a solution of 5.7 parts (0.137 mole) of 97% sodium hydroxide in 20 parts of water is added dropwise, the final temperature and pH being 34° C. and 4, respectively. The temperature is brought to about 40° C. for a few minutes and then, after cooling, the product is separated by filtering. The filter cake is washed well with water. After the material has been dried in vacuo, it melts at 229–231° with decomposition.

EXAMPLE 14

2-chloro-4,6-bis(N-hydroxy-N-para-chlorophenylamino)-s-triazine

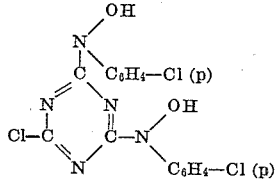

A solution of 3.33 parts (0.0179 mole) of cyanuric chloride in 9 parts of dioxane is added quickly to stirring ice water at 5° C. To the resulting slurry there is added a solution of 5 parts (0.0358 mole) of N-(p-chlorophenyl) hydroxylamine in 11.5 parts dioxane at about 2° C. in 8 minutes. After the mixture has been warmed to room temperature, about 11.5 parts of 3.12 N solution (0.0358 mole) of sodium hydroxide is added over 12 minutes at such a rate as to keep the mixture neutral or slightly alkaline. The temperature is brought to about 45° C. The mixture is chilled, and the aqueous phase is decanted. The gummy residue is slurried with water several times and filtered, and after air drying, the product is washed with hexane. The product (6.1 parts) melts at 91–93.5 with decomposition.

EXAMPLE 15

2-chloro-4,6-bis(N-hydroxy-N-cyclohexylamino)-s-triazine

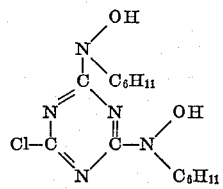

The procedure of Example 13 is repeated substituting an equivalent amount of N-cyclohexylhydroxylamine for the N-phenylhydroxylamine.

EXAMPLE 16

2-chloro-4,6-bis(N-hydroxy-N-beta-cyanoethylamino)-s-triazine

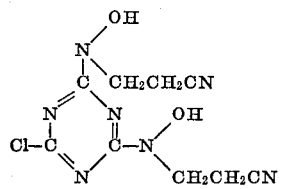

The procedure of Example 13 is repeated substituting an equivalent amount of N-(beta-cyanoethyl) hydroxylamine for the N-phenylhydroxylamine.

EXAMPLE 17

2-diethylamino-4,6-bis(N-methyl-N-hydroxylamino)-s-triazine

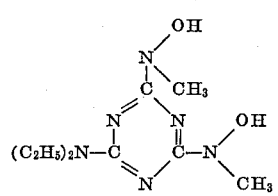

The procedure of Example 6 is repeated substituting an equivalent amount of N-methylhydroxylamine for the hydroxylamine.

EXAMPLE 18

2,4-dianilino-6-hydroxylamino-s-triazine

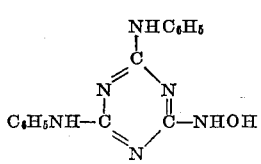

The procedure of Example 10 is repeated substituting an equivalent amount of 2,4-dianilino-6-chloro-s-triazine for the 2-chloro-4,6-bis(ethylamino)-s-triazine.

EXAMPLE 19

2-diethylamino - 4,6 - bis(N - hydroxy-N-phenylamino)-s-triazine

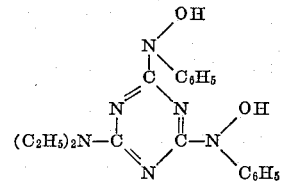

A mixture of 10.2 parts (0.031 mole) of 2-chloro-4,6-bis(N-hydroxy-N-phenylamino) - s - triazine, 6.8 parts (0.093 mole) of diethylamine and about 100 parts of dioxane is heated at reflux for six hours and is then allowed to cool overnight. The precipitate which forms on addition of about 1,000 parts of water is filtered off and air-dried giving 5.92 parts having a melting point of 103–125° C. (dec.). A mixture of 4 parts of this material and about 300 parts of chloroform is boiled for a few minutes and filtered hot. The dry cake (0.6 g.) melts gradually with decomposition from 240 to 283° C.

EXAMPLE 20

2 - (p-chloroanilino)-4,6-bis(hydroxyamino) - s - triazine

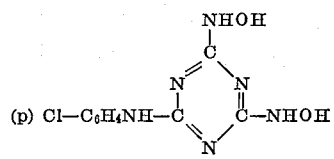

The procedure of Example 9 is repeated using an equivalent amount of 2-(p-chloroanilino)-4,6-dichloro-s-triazine in place of the 2-(N-methylanilino)-4,6-dichloro-s-triazine used therein.

EXAMPLE 21

2 - (beta - hydroxyethylamino)-4,6-bis(hydroxyamino)-s-triazine

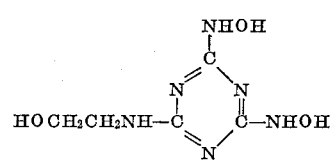

The procedure of Example 9 is repeated using an equivalent amount of 2,4-dichloro-6-(β-hydroxyethylamino)-s-triazine in place of the triazine used therein.

EXAMPLE 22

2,4-bis(hydroxyamino)-6-phenoxy-s-triazine

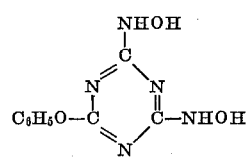

A mixture of 22.5 parts (0.1 mole) of 2,4-dichloro-6-phenoxy-s-triazine, 19.8 parts (.6 mole) of hydroxylamine and 200 parts of $H_2O$ is heated at 50° C. for ½ hour and then at reflux for 1 hour. The solid which forms on chilling is collected and is the desired product.

EXAMPLE 23

2,4 - bis(N-hydroxy - N - phenylamino)-6-phenylmercapto-s-triazine

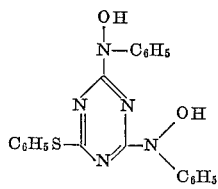

A mixture of 20.4 parts (0.062 mole) of 2-chloro-4,6-bis(N-hydroxy-N-phenylamino)-s-triazine, 7.7 parts (0.07 mole) of phenylmercaptan, 2.8 parts parts (0.07 mole) of sodium hydroxide and 150 parts of water are refluxed for one hour and then cooled. The solid which is collected is the desired product.

EXAMPLE 24

This example shows the ability of hydroxyamino-s-triazines of this invention to chelate heavy metals from a solution containing them.

One gram of the test compound is dissolved in 15 ml. of dimethylformamide and to the solution is added 0.2 gram of FeCl$_3$. The color change is observed, development of color indicating formation of an iron chelate. One control run with no test compound and four runs with triazines having methoxyamino radicals were also conducted.

The results of these tests are given in the following table.

TABLE II

| Run | Compound | Color |
|---|---|---|
| 1 | Control | Light orange. |
| 2 | 2,4,6-tris(hydroxyamino)-s-triazine | Brown-red. |
| 3 | 2,4-diamino-6-hydroxyamino-s-triazine | Violet. |
| 4 | 2,4-dihydroxy-6-hydroxyamino-s-triazine | Purple. |
| 5 | 2,4-dichloro-6-(N-phenylhydroxyamino)-s-triazine. | Blue. |
| 6 | 2-anilino-4-chloro-6-hydroxyamino-s-triazine | Purple. |
| 7 | 2-anilino-4-hydroxy-6-hydroxyamino-s-triazine. | Do. |
| 8 | 2-N-methylanilino-4,6-bis(hydroxyamino)-s-triazine. | Blue-black. |
| 9 | 2,4-bis(ethylamino)-6-hydroxyamino-s-triazine. | Purple. |
| 10 | 2-hydroxy-4,6-bis(hydroxyamino)-s-triazine | Do. |
| 11 | 2-chloro-4,6-bis(N-hydroxy-N-phenylamino)-s-triazine. | Purple-black. |
| 12 | 2-chloro-4,6-bis(N-hydroxy-N-para-chlorophenylamino)-s-triazine. | Do. |
| 13 | 2,4,6-tris(methoxyamino)-s-triazine | Light orange. |
| 14 | 2-diethylamino-4,6-bis(methoxyamino)-s-triazine. | Do. |
| 15 | 2,4-dichloro-6-methoxyamino-s-triazine | Do. |
| 16 | 2-(p-chloroanilino-4,6-bis(methoxyamino)-s-triazine. | Do. |

Triazine compounds with hydroxyamino groups (Runs 2–12) have chelating power whereas the methoxyamino triazines do not.

I claim:

1. Compound of the formula:

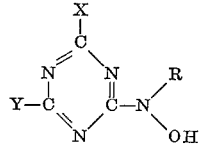

wherein X and Y are individually selected from the group consisting of hydrogen, halogen, hydroxy, lower alkoxy, monocarbocyclic aryloxy, monocarbocyclic arylthio, and

with the proviso that both X and Y cannot be hydroxy; each R is a member selected from the group consisting of hydrogen, alkyl of up to 18 carbon atoms, cycloalkyl of up to 18 carbon atoms, monocarbocyclic aryl, hydroxy lower alkyl, and cyanoethyl; and R$^1$ is a member selected from the group consisting of R and OH groups, said aryl moieties having up to two substituents selected from the group consisting of nitro, trifluoromethyl, hydroxy, cyano, lower alkoxy, and halo radicals.

2. 2,4,6-tris-(hydroxyamino)-s-triazine.
3. 2-diethylamino-4,6-bis(hydroxyamino)-s-triazine.
4. 2,4-bis(ethylamino)-6-hydroxyamino-s-triazine.
5. 2-chloro-4,6(N-hydroxy-N-phenylamino)-s-triazine.

References Cited

UNITED STATES PATENTS 3,429,881   2/1969   Knusli et al. _____ 260—249.8

FOREIGN PATENTS 819,520   9/1959   Great Britain.
222,552   5/1958   Australia.

OTHER REFERENCES

Ostrogovich et al., Chemiches Zentralblatt, vol. 113, pp. 1879–81 (1942).

NORMA S. MILESTONE, Primary Examiner

JOHN M. FORD, Assistant Examiner

U.S. Cl. X.R.

99—163; 252—51.5, 401, 408; 260—242, 249.5, 249.8, 249.9, 999